(12) United States Patent
Lisalova et al.

(10) Patent No.: US 12,435,170 B2
(45) Date of Patent: Oct. 7, 2025

(54) TERPOLYMER AND POLYMER BRUSHES FOR USE AGAINST NON-SPECIFIC ADSORPTION OF SUBSTANCES FROM BIOLOGICAL MEDIA

(71) Applicant: FYZIKALNI USTAV AV CR, V. V. I., Prague (CZ)

(72) Inventors: Hana Lisalova, Prague (CZ); Marketa Vrabcova, Prague (CZ); Ivana Visova, Ceska Trebova (CZ); Milan Houska, Prague (CZ); Alexandr Dejneka, Brandys nad Labem (CZ)

(73) Assignee: FYZIKALNI USTAV AV CR, V.V.I., Prague (CZ)

( * ) Notice: Subject to any disclaimer, the term of this patent is extended or adjusted under 35 U.S.C. 154(b) by 534 days.

(21) Appl. No.: 17/924,823

(22) PCT Filed: Mar. 18, 2021

(86) PCT No.: PCT/CZ2021/050033
§ 371 (c)(1),
(2) Date: Nov. 11, 2022

(87) PCT Pub. No.: WO2021/228289
PCT Pub. Date: Nov. 18, 2021

(65) Prior Publication Data
US 2023/0272138 A1    Aug. 31, 2023

(30) Foreign Application Priority Data

May 14, 2020   (CZ) ................... PV 2020-270

(51) Int. Cl.
C08F 220/60   (2006.01)
G01N 33/543   (2006.01)

(52) U.S. Cl.
CPC ... *C08F 220/606* (2020.02); *G01N 33/54373* (2013.01); *G01N 33/54393* (2013.01)

(58) Field of Classification Search
None
See application file for complete search history.

(56) References Cited

U.S. PATENT DOCUMENTS

2011/0305898 A1     12/2011 Zhang et al.
2015/0056411 A1*    2/2015  Zhang ................. B32B 27/288
                                              428/447
2018/0346634 A1     12/2018 Rodriguez-Emmenegger et al.

OTHER PUBLICATIONS

Lisalova et al., "Copolymer Brush-Based Ultralow-Fouling Biorecognition Surface Platform for Food Safety", Analytical Chemistry, 88, published Sep. 30, 2016, pp. 10533-10539. (Year: 2016).*

(Continued)

*Primary Examiner* — Rebecca M Giere
(74) *Attorney, Agent, or Firm* — Notaro, Michalos & Zaccaria P.C.

(57) ABSTRACT

A random terpolymer of N-(2-hydroxypropyl) methacrylamide, carboxybetaine methacrylamide and sulfobetaine methacrylamide, and a polymer brush and to a functionalized polymer brush containing this terpolymer are disclosed. The random terpolymer increases the resistance of the substrate surface to non-specific adsorption of substances from biological media and/or to non-specific interaction with biological media components, and is suitable for use in the form of a polymer brush, for example in sensors or membranes.

20 Claims, 3 Drawing Sheets

Specification includes a Sequence Listing.

(56) References Cited

OTHER PUBLICATIONS

Lisalova, Hana, et al.; "Ultralow-Fouling Behavior of Biorecognition Coatings Based on Carboxy-Functional Brushes of Zwitterionic Homo- and Copolymers in Blood Plasma: Functionalization Matters"; Analytical Chemistry 2017; 89(6):3524-3531.
Van Andel, Esther, et al.; "Systematic Comparison of Zwitterionic and Non-Zwitterionic Antifouling Polymer Brushes on a Bead-Based Platform"; Langmuir 2018; 35(5):1181-1191.
International Search Report and Written Opinion for PCT/CZ2021/050033 dated Aug. 2, 2021.
International Application Status Report received Mar. 22, 2021.

* cited by examiner

TERPOLYMER AND POLYMER BRUSHES FOR USE AGAINST NON-SPECIFIC ADSORPTION OF SUBSTANCES FROM BIOLOGICAL MEDIA

REFERENCE TO AN ELECTRONIC SEQUENCE LISTING

The contents of the electronic sequence listing (sequence-listing.txt; Size: 715 bytes; and Date of Creation: Apr. 3, 2023) is herein incorporated by reference in its entirety.

FIELD OF ART

The invention relates to a new random anti-fouling terpolymer, to polymer brushes containing the terpolymer, and to their use against non-specific adsorption of substances from biological media.

BACKGROUND ART

Non-specific adsorption is an undesirable deposition of substances from complex biological samples, which represents a critical problem for the development of many modern bioanalytical and biomedical methods, equipment and materials. These include biosensors, separation methods, functional nanoparticles and nanostructured surfaces, drug carriers, membranes, diagnostic particles for analysis in body fluids, generally any bioanalytical methods and functional materials that come into direct contact with the biological medium. Therefore, great efforts are devoted to the development of so-called ultra-resistant materials and surfaces which effectively combine the ability to bind functional, e.g. biorecognition elements, and which are also resistant to non-specific adsorption of substances even from very complex biological media such as undiluted body fluids, food extracts, media containing cells, tissue samples and parts of organisms in general, or fluids from environments of a general nature.

Currently, the most resistant (so-called 'anti-fouling' or 'ultra-low fouling') and at the same time functionalizable surfaces are those prepared by polymerization from the surface ('grafting from') of hydrophilic electroneutral polymers, such as non-ionogenic poly(oligo (hydroxyethyleneglycol methacrylate) (polyHOEGMA), poly(2-hydroxyethyl methacrylate) (polyHEMA), poly(3-hydroxypropyl methacrylate) (polyHPMA), poly[N-(2-hydroxypropyl methacrylamide] (polyHPMAA) and ionogenic zwitterionic poly(carboxybetain methacrylate) (polyCBMA), poly(carboxybetaine acrylamide) (polyCBAA) and a random copolymer of N-(2-hydroxypropyl) methacrylamide (HPMAA) with carboxybetaine methacrylamide (CBMAA) (poly(HPMAA-co-CBMAA)), from the surface of substrates by surface-initiated atom-transfer radical polymerization (ATRP). The procedure involves covalently attaching an ATRP initiator to the surface of the substrate (S). After the addition of the polymerization solution containing the monomers, the polymer chains grow from the bound initiator residue (R) by successive attachment of the monomer units, the halogen initiating atom always being transferred to the end of the growing polymer chain. The result of the procedure is a so-called polymer brush, which is a layer of densely arranged polymer chains linked by one end to the surface of the substrate according to the formula: S—R-polymer chain. In the current state of the art, it is not possible to reliably determine the length of the individual chains nor the density of the brush for polymer brushes grafted from the surface. Therefore, the brush is usually characterized only by the thickness measured by the ellipsometric method with surface plasmon resonance (SPR) or by atomic force microscopy (AFM).

Preparation and activation of brushes from polyCBMA and polyCBAA homopolymers are disclosed in the document US20140370567. This document describes, inter alia, anti-fouling surfaces prepared by grafting polyCBMA and polyCBAA homopolymers from a substrate surface by ATRP or RAFT polymerization, and block copolymers comprising a hydrophobic polymer block and a polyCBMA or polyCBAA homopolymer block grafted by polymerization from the surface or bonded to the substrate surface. Document US20130244249 describes a procedure using a two-stage ATRP in which a polymer layer with a high chain density and good anti-fouling properties is first grafted onto the surface. Onto this layer, a second layer of polyCBMA or polyCBAA of low density polymer chains with reactive groups along the chain is grafted, which serves to immobilize the bioactive elements. The explicitly claimed aim of this procedure is to increase the availability of reactive groups for the binding of large molecules in the second layer, but the document does not address the issue of side reactions and undesired reaction residues. Document PV 2015-313 discloses the preparation and use of random copolymer poly(HPMAA-co-CBMAA) and compares its anti-fouling properties after anchoring functional elements with polyCBAA.

Although all of the above polymer brushes suppress non-specific adsorption from model protein solutions and reduce deposition from undiluted blood plasma below 50 ng/cm$^2$, HPMAA, CBMA and CBAA brushes are currently the only 'ultra-low fouling' surfaces that reduce non-specific binding of substances from blood plasma below 5 ng/cm$^2$. It is generally accepted that high resistance to non-specific adsorption is due to a combination of high hydrophilicity, which limits hydrophobic interactions, and net electroneutrality, which limits electrostatic interactions. The binding of functional entities, which can be substances and large molecules with different domains and a large number of charges, can significantly change this surface characteristic and worsen the initially excellent resistance.

E.g. for binding of functional entities to the non-ionogenic polymer chains, the activation of their side hydroxyl groups is used, which, however, leads to the formation of products which significantly impair or completely destroy the resistance of the brushes to non-specific adsorption.

The electroneutral zwitterionic side groups of the polyCBMA and polyCBAA chains contain a carboxylate anion and a quaternary ammonium cation. The carboxyl group of the zwitterion is usually converted to an active ester by EDC-NHS chemistry, but other carboxyl activating agents known to those skilled in the art (Bioconjugate Techniques, G. T. Hermanson, Elsevier, 2013) can be used, which then reacts with the amino group of the functional element to form an amide bond. However, part of the unreacted active esters always remain in the polymer and then must be removed quantitatively, so that upon subsequent contact with the biological medium they cannot react non-specifically with its components, as well as to preserve as much as possible the original electroneutrality of the polymer, i.e. to compensate for the predominance of the permanent positive charge of the quaternary ammonium group. Simple hydrolysis of the active ester is not sufficient for this, and therefore the remaining active esters are preferably eliminated by reaction with a small molecule containing an amino group and a carboxyl group, e.g. with glycine (PV 2016-361). However, none of these methods has so far proved to be entirely satisfactory, and it is the loss of the overall electroneutrality of the surface that is considered to be one of the key factors leading to reduced brush anti-fouling ability after binding of functional elements.

The present invention aims to overcome the above disadvantages.

DISCLOSURE OF THE INVENTION

The present invention relates to a random terpolymer of N-(2-hydroxypropyl) methacrylamide (HPMAA), carboxybetaine methacrylamide (CBMAA) and sulfobetaine methacrylamide (SBMAA). This terpolymer is designated as poly(HPMAA-co-CBMAA-co-SBMAA).

Preferably, the random terpolymer contains from 0.1 to 40 mol % SBMAA, more preferably from 0.5 to 30 mol % SBMAA.

Preferably, the random terpolymer of the invention contains from 0.1 to 50 mol % CBMAA, more preferably from 5 to 30 mol % CBMAA, even more preferably from 10 to 20 mol % CBMAA.

HPMAA forms the balance to 100 mol % in the terpolymer.

The invention further relates to a polymer brush containing the random terpolymer of N-(2-hydroxypropyl) methacrylamide (HPMAA), carboxybetaine methacrylamide (CBMAA) and sulfobetaine methacrylamide (SBMAA), the chains of which are linked by one end (end-tethered) to a substrate, the polymer brush having the structure I,

S—R-poly(HPMAA-co-CBMAA-co-SBMAA)   (I)

wherein
S is a substrate having a surface suitable for binding of polymerization initiators;
R is a residue of a polymerization initiator selected from the group consisting of ATRP initiators, SET-LRP initiators and RAFT agents;
— is a covalent bond.

A polymer brush is a structure that consists of polymer chains end-tethered (linked by one end) to a substrate, the polymer chains being arranged densely next to each other so as to extend away from the substrate. The resulting structure of the polymer chains resembles the fibres of a brush, hence the name.

Preferably, the thickness of the random terpolymer layer in the polymer brush is 10 to 500 nm, more preferably 20 to 200 nm, as measured by the ellipsometric method in water.

The invention also relates to a functionalized polymer brush of random terpolymer of N-(2-hydroxypropyl) methacrylamide (HPMAA), carboxybetain methacrylamide (CBMAA) and sulfobetaine methacrylamide (SBMAA), having the structure II S—R-poly(HPMAA-co-CBMAA-co-SBMAA)-F   (II)

wherein
S is a substrate having a surface suitable for binding of polymerization initiators;
R is a residue of a polymerization initiator selected from the group consisting of ATRP initiators, SET-LRP initiators and RAFT agents;
— is a covalent bond;
F is at least one functional entity covalently bound to the random terpolymer by an amide bond.

The present invention solves the above-described problem of loss of total surface electroneutrality in problematic hydrolytic reactions of residual active esters, which leads to reduced brush anti-fouling properties after binding of functional molecules. In the procedures known in the art, the hydrolysis of residual active esters, including using substances containing a carboxyl group, can regenerate carboxyl groups, but not completely, since the loss caused by the binding of the functional element is not compensated. The zwitterion thus replaced is also not structurally identical to the original zwitterion. It is also generally known that the electroneutrality of carboxybetaines is pH dependent due to changes in carboxyl group ionization while maintaining a permanent positive charge of the quaternary ammonium cation. The binding of a functional entity, which can be, for example, a large molecule with different domains and a large number of charges on its own, creates a substantially altered microenvironment on the surface, i.e. also a local pH, and thus affects the charge balance. The present invention solves this problem in a new way, by adjusting the equilibrium through adding the SBMAA monomer unit, which is a betaine with a permanently ionized sulfo group. The sulfo group does not participate in the reaction of activating carboxyl groups with activating agents (e.g. EDC-NHS or other carboxyl activating agents known to the person skilled in the art), therefore a polySBMAA homopolymer could not be functionalized. Furthermore, a polySBMAA homopolymer does not have good anti-fouling properties. In poly(HPMAA-co-CBMAA-co-SBMAA), the functionalizability is ensured by the presence of CBMAA. The use of SBMAA in combination with HPMAA and CBMAA for the polymer brush has not been known so far. Suprisingly, the use of SBMAA is very advantageous and effective for overcoming the drawbacks of the prior art polymer brushes.

Within the above-mentioned range from 0.1 to 30 mol %, the SBMAA content in the random terpolymer may be optimized to cooperate with the functional entity to achieve the highest resistance to non-specific adsorption. This optimization can be performed by preparing several samples with different SBMAA contents within the described range, and selecting the appropriate SBMAA content according to the desired parameters.

The terpolymer of the present invention possesses a high resistance to non-specific adsorption of substances from biological media, and likewise the polymer brushes containing the said terpolymer possess high anti-fouling properties, even after the activation reaction (i.e., the active ester formation), binding of functional entity and deactivation.

The term "biological media" herein refers to body fluids, such as blood, cerebrospinal fluid, urine, saliva and ascitic fluid, but also to other media of biological origin, such as blood plasma and serum, cell lysates, tissue extracts, cell suspensions, media from biological production, drinking water, waste water and/or foodstuff.

The substrate S is a material that is coated with a functionalizable layer of terpolymer resistant to non-specific adsorption. The substrate is any material to the surface of which polymerization initiators can be covalently attached. Thus, suitable substrates include, in particular, materials containing reactive groups on the surface or inert materials coated with an anchoring layer adhering well to their surface and containing reactive groups for the attachment of an initiator, for example a layer of polydopamine prepared by autopolymerization on the surface of the material. The shape, dimensions, morphology and chemical nature of the substrate are not critical. The substrates may include planar or variously shaped objects, tubes, fibres, particles, membranes, microparticles, nanoparticles, porous materials. Materials of the substrate may include metals, silicon, silicate or aluminosilicate based materials (e.g. glass), polymers, inorganic materials—especially oxides of metals or non-metals, etc. In a preferred embodiment, the materials are in particular metals, silicon, oxides of metals or non-metals, silicates or aluminosilicates. The substrate can be, for example, a surface of a sensor, a surface of a biosensor, or a sorbent, or a surface of a device or material used in healthcare.

The group R designates the residue of an initiator. To anchor the copolymer chain (for a grafting-from reaction), a polymerization initiator is first be attached to the substrate. Suitable initiators and suitable types of polymerization for grafting from the surface are known to the person skilled in the art, including ATRP (atom transfer radical polymerization) initiators, SET-LRP (single-electron transfer living radical polymerization) initiators or RAFT (reversible addition fragmentation transfer) polymerization reagents. The procedure for binding of the initiator to the substrate depends on the type of the substrate and the initiator, but its determination, as well as the determination of a suitable initiator for each substrate, is within the knowledge and ability of a person skilled in the art, without the need for further inventive efforts (a number of monographs, textbooks and review articles are available to the person skilled in the art, for example Advanced Materials by Atom Transfer Radical Polymerization, Kryzstof Matyjaszewki, Wiley Online Library, 2018).

F is a functional entity covalently attached by an amide bond to the polymer brush, more specifically to the residue of the carboxyl group of a CBMAA monomer unit. F is an entity containing an amino group, e.g. selected from proteins, peptides, antibodies, oligonucleotides, nucleic acids, DNA probes. F can be a biorecognition entity that specifically interacts with a target analyte, which may be, for example, a protein, a peptide, a nucleic acid, an oligonucleotide, or other organic or inorganic analytes.

The terpolymer poly(HPMAA-co-CBMAA-co-SBMAA) may be prepared by known techniques, e.g. by living radical polymerization methods. The terpolymer brush may be prepared by living radical polymerization from the surface of a substrate to form polymer brush chains end-tethered to the surface of the substrate. "Grafting to" methods can also be used, where an already synthesized polymer chain binds to the substrate.

Suitable polymerization methods for preparing the random terpolymer of the invention or a polymer brush containing the terpolymer, e.g. ATRP polymerization, SET-LRP polymerization, RAFT polymerization, their use for individual substrate types, the corresponding initiators and the corresponding reactive groups for initiator and substrate combinations are known from literature. Examples of combinations of initiators suitable for certain substrates are: 11-(trichlorosilyl)undecyl-2-bromo-2-methyl propanoate on glass and oxide-coated silicon; or ω-mercaptoundecyl bromisobutyrate on gold; or an initiator bound to the surface of a substrate containing carboxyl groups which is prepared by incubation with a solution of a-bromo-isobutyric acid, EDC and NHS; or 2-bromo-2-methylpropanoyl bromide as an initiator for a substrate containing amino or hydroxyl groups on the surface, such as a polydopamine layer.

All monomers are methacrylamides of a similar type in terms of polymerization, have a similar polymerization rate constant, and the statistical nature of the polymerization is evidenced by the molar ratio of concentrations of SBMAA, HPMAA and CBMAA monomer units in terpolymers, identical to the polymerization batch composition.

The preparation of functionalized polymer brushes is performed by reacting the carboxyl groups of polycarboxybetaines (CBMAA units) in a polymer brush with activating agents, such as for example EDC (1-ethyl-3-(3-dimethylaminopropyl)-carbodiimide) and NHS (N-hydroxysuccinimide), to form active ester groups. The resulting active ester groups are further reacted with the amine group of a functional entity to form an amide covalent bond. The remaining unreacted active ester groups are then reacted with a deactivating agent, for example (2-aminoethoxy)acetic acid (amino-PEG2-acetic acid) and/or glycine.

The invention allows for universal anti-fouling treatment of various substrates containing reactive groups for the attachment of polymerization initiators. An anchoring interlayer, for example polydopamine, may be deposited on the surface of an inert substrate. The initiators cannot be bound to an inert substrate directly. The anchoring interlayer contains reactive groups for the attachment of initiators.

The present invention also relates to the use of the random terpolymer poly(HPMAA-co-CBMAA-co-SBMAA) for increasing the resistance of a surface to non-specific adsorption of substances from biological media (i.e., for increasing anti-fouling properties of a surface). In such use, the surface can be coated with the terpolymer poly(HPMAA-co-CBMAA-co-SBMAA), for example in the form of a coating or in the form of a polymer brush.

More specifically, the invention relates to the use of the random terpolymer poly(HPMAA-co-CBMAA-co-SBMAA) in the form of the terpolymer brush or a coating, or functionalized terpolymer brush, to achieve (substrate) surface resistance to undesired non-specific interaction with biological media components, especially with protein molecules and cells, and to achieve (substrate) surface resistance to adsorption/deposition of biological media components on the surface protected by the terpolymer.

The invention further includes the use of the functionalized terpolymer brush poly(HPMAA-co-CBMAA-co-SBMAA) for specific and selective interaction with a target analyte, such as a protein, a peptide, a nucleic acid, an oligonucleotide.

The present invention further encompasses sensors, in particular biosensors, for direct analyte detection or for multi-stage detection using added reagents, such as surface plasmon resonance (SPR) sensors, quartz crystal microbalance or fluorescent sensors that contain the polymer brush or the functionalized polymer brush according to the invention.

The present invention further includes membranes comprising the polymer brush or the functionalized terpolymer brush of the invention. The substrate is then typically a membrane, the layer of polymer chains being grafted onto the membrane surface. If the membrane is porous, the layer of polymer chains is grafted onto the surface of the pores.

The terms "polymer brush" and "terpolymer brush" in this chapter refer to a polymer brush consisting of the terpolymer poly(HPMAA-co-CBMAA-co-SBMAA), unless the immediate context shows otherwise.

BRIEF DESCRIPTION OF DRAWINGS

Line (2) in FIG. 1 shows PM-IRRAS spectra of terpolymer prepared in solution by RAFT polymerization as described in Example 3.

EXAMPLES

Example 1: Preparation of a Polymer Brush on Gold

A glass plate with a vapour-deposited gold layer was cleaned in a UV ozone generator for 10 minutes, then immediately rinsed with water and ethanol. The plate was then immersed in a 0.1 mM solution of ω-mercaptoundecyl bromoisobutyrate initiator in ethanol for 48 hours at room temperature without exposure to light. The catalyst mixture was prepared in a Schlenk flask by dissolving CuCl (28 mg), $CuCl_2$ (8.4 mg) and Me4cyclam (96.8 mg) in degassed methanol (2 mL) under a nitrogen atmosphere and sonicated for 5 minutes until complete dissolution. In a second Schlenk flask, the monomers SBMAA (138 mg, 3 mol %), CBMAA (572 mg, 15 mol %) and HPMAA (1.847 mg, 82 mol %) were dissolved in degassed water (16.9 mL) and methanol (0.1 mL). Examples of additional batches for the preparation of surfaces with a different percentage of components are given in Table 1. After dissolution, the catalyst mixture was added to the monomer mixture under nitrogen. The homogeneous polymerization mixture was added to the reactor with a plate coated with initiator under nitrogen. The polymerization was carried out in the closed reactor for 2 hours at room temperature. The plate was then rinsed with water and stored in phosphate buffer (pH 7.4) at 4° C. before further use.

Figure 1:
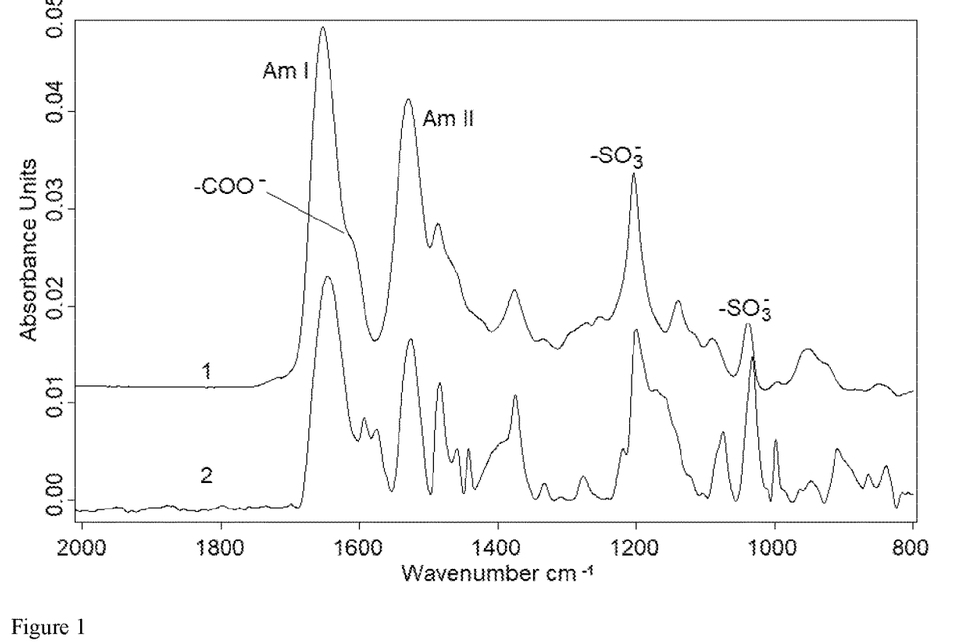
FIG. 1: Line (1) shows a typical IRRAS spectrum of the poly[HPMAA(70 mol %)-co-CBMAA(15 mol %)-co-SBMAA(15 mol %)] brush on gold. The characteristic absorption bands of the groups of individual components are marked: Am I and Am II for amide bands of the chain, —OH for the band of the hydroxyl group of HPMAA, —COO$^-$ for the band of the ionized carboxyl group of CBMAA, —SO$_3^-$ for the bands of the ionized sulfo group of SBMAA.

The chemical structure of the terpolymer brush was verified by infrared reflection absorption spectroscopy (PM-IRRAS). FIG. 1 shows a typical IRRAS spectrum for one embodiment of the terpolymer brush.

Example 2: Preparation of a Polymer Brush on Glass

A glass plate was rinsed with acetone, sonicated for 20 minutes in 50% methanol at 20° C. and then sonicated for another 20 minutes in chloroform. The plate was then rinsed with water, air dried and cleaned for 4 minutes in a UV ozone generator. After cleaning, the plate was dehydrated for 1 hour at ≥90° C. in the presence of silica gel and immediately then immersed for 2 hours in a 3 mM solution of the initiator $(MeO)_3$—Si—$(CH_2)_{11}$—Br in anhydrous n-heptane at room temperature. The plate was then rinsed with ethanol and water and placed in the reactor to polymerize. Another procedure for preparing the polymer brush is analogous to Example 1 above. The catalyst mixture was prepared in a Schlenk flask by dissolving CuCl (28 mg), $CuCl_2$ (8.4 mg) and Me4cyclam (96.8 mg) in degassed methanol (2 mL) under nitrogen atmosphere and sonicated for 5 minutes until complete dissolution. In a second Schlenk flask, the monomers SBMAA (138 mg, 3 mol %), CBMAA (572 mg, 15 mol %) and HPMAA (1,847 mg, 82 mol %) were dissolved in degassed water (16.9 mL) and methanol (0.1 mL). (Other examples of batches are the same as the examples of batches listed in Table 1). After dissolution, the catalyst mixture was added to the monomer mixture under nitrogen. The homogeneous polymerization mixture was added to the reactor with a plate with attached initiator under nitrogen. The polymerization was carried out in the closed reactor for 2 hours at room temperature. The plate was then rinsed with water and stored in phosphate buffer (pH 7.4) at 4° C. before further use.

Example 3: Preparation of Terpolymer in Solution by RAFT Polymerization

The terpolymer (pSBMAA 3 mol. %; pCBMAA 20 mol. %; pHPMAA 77 mol. %) in solution was prepared using modified RAFT (Reversible Addition Fragmentation Transfer) polymerization procedure described previously (C. Rodriguez-Emmenegger, B. V. K. J. Schmidt, Z. Sedlakova, V. Šubr, A. Bologna Alles, E. Brynda, C. Barner-Kowollik, *Macromolecular Rapid Communications* 2011, 32, 958).

Briefly, the monomers—N-(2-hydroxypropyl)methacrylamide (HPMAA; 344.0 mg; 77 mol. %), carboxybetaine methacrylamide (CBMAA; 151.2 mg; 20 mol. %) and sulfobetaine methacrylamide (SBMAA; 27.4 mg; 3 mol. %)—and initiator 4,4-azobis(4-cyanopentanoic acid) (0.504 mg; 0.45 mM) were dissolved in 4 ml of acetic acid buffer (0.27 M acetic acid and 0.73 M sodium acetate, pH 5.2) in a Schlenk flask. In a second glass vial, a solution of RAFT agent 4-cyano-4-(phenylcarbonothioylthio) pentanoic acid (100 mg; 5 mg/ml) in 20 ml of 0.05 M sodium hydroxide

TABLE 1

Selected examples of batches for the preparation of terpolymer with different content of individual monomers

| Composition of polymerization batch [mol %] | | | Composition of polymerization batch [mg] | | |
|---|---|---|---|---|---|
| HPMAA | CBMAA | SBMAA | HPMAA | CBMAA | SBMAA |
| 84.5 | 15.0 | 0.5 | 1.903 | 572 | 23 |
| 82.0 | 15.0 | 3.0 | 1.847 | 572 | 138 |
| 80.0 | 15.0 | 5.0 | 1.802 | 572 | 230 |
| 75.0 | 15.0 | 10.0 | 1.689 | 572 | 460 |
| 70.0 | 15.0 | 15.0 | 1.576 | 572 | 690 |
| 55.0 | 15.0 | 30.0 | 1.239 | 572 | 1.379 | was prepared. Both freshly prepared solutions were mixed in the Schlenk flask in an ice bath and the mixture was purged with nitrogen and stirred for 1 hour. Then, the polymerization mixture was heated at 75° C. for 10 hours in an oil bath. The reaction was stopped via rapid cooling and exposure to air. The polymerization solution was then dialyzed against Milli-Q water for 72 hours using SpectraPor 3 membrane (MWCO: 3500 Da), ultrapure water was changed several times. After the dialysis, the solution was freeze-dried to yield a solid product. The chemical structure of the terpolymer was verified by infrared spectroscopy (FIG. 1, line (2)). The infrared spectra contained characteristic bands of all components (amide: 1642 $cm^{-1}$, 1528 $cm^{-1}$, carboxyl: 1723 $cm^{-1}$, 1594 $cm^{-1}$, sulfo: 1200 $cm^{-1}$, 1033 $cm^{-1}$).

Example 4: Bacterial Antibody Binding

A poly[(HPMAA(80 mol %)-co-CBMAA(15 mol %)-co-SBMAA(5 mol %)] terpolymer brush was prepared on the gold layer of the chip according to Example 1. The chip was rinsed with water, inserted into the SPR sensor and carboxyl groups of CBMAA were activated for 20 minutes at a flow rate of 10 μL/min with a solution of 0.1M NHS and 0.5M EDC in deionized water to the active ester. After activation, the level of sensor response for the surface in water was recorded. 50 μg/mL of bacterial anti-*Salmonella* antibody was dissolved in borate buffer (10 mM, pH 8.5), infused into the microfluidic system of the SPR sensor at a rate of 30 μL/min and covalently bound by reaction with the activated brush (20 minutes). After immobilization of the antibody, the level of sensor response in water was again recorded. The amount of bound antibody was determined from the difference between the sensor response in water before antibody injection and the response in water after immobilization was completed (FIG. 2, the 'immobilization level' corresponds to 206 ng/cm²).

Example 5: Functionalization Capacity and Resistance to Non-Specific Adsorption after Binding of Functional Entities According to Example 1, poly(HPMAA-co-CBMAA-co-SBMAA) terpolymer brushes were prepared containing (a) 84.5 mol % HPMAA, 15 mol % CBMAA, 0.5 mol % SBMAA, (b) 82 mol % HPMAA, 15 mol % CBMAA, 3 mol % SBMAA and (c) 55 mol % HPMAA, 15 mol % CBMAA, 30 mol % SBMAA on the gold layer. Furthermore, two already known reference antifouling surfaces were prepared, showing a high degree of resistance to non-specific bonds and at the same time sufficient functionalization capacity—a copolymer containing 85 mol % HPMAA and 15 mol % CBMAA (WO2016177354A3) and a polyCBAA homopolymer. The following is a procedure for the preparation of these polymers:

poly[HPMAA(85 mol %)-co-CBMAA(15 mol %)]

A glass plate with a vapour-deposited gold layer was cleaned in a UV ozone generator for 10 minutes, then immediately rinsed with water and ethanol. The plate was then immersed in a 0.1 mM solution of ω-mercaptoundecyl bromoisobutyrate initiator in ethanol for 48 hours at room temperature without exposure to light. The catalyst mixture was prepared in a Schlenk flask by dissolving CuCl (28 mg), $CuCl_2$ (8.4 mg) and Me4cyclam (96.8 mg) in degassed methanol (2 mL) under a nitrogen atmosphere and sonicated for 5 minutes until complete dissolution. In a second Schlenk flask, the monomers CBMAA (572 mg, 15 mol %) and HPMAA (1,914 mg, 85 mol %) were dissolved in degassed water (16.9 mL) and methanol (0.1 mL). After dissolution, the catalyst mixture was added to the monomer mixture under nitrogen. The homogeneous polymerization mixture was added to the reactor with a plate coated with initiator under nitrogen. The polymerization was carried out in the closed reactor for 2 hours at room temperature. The plate was then rinsed with water and stored in phosphate buffer at 4° C. before further use.

polyCBAA

A glass plate with a vapour-deposited gold layer was cleaned in a UV ozone generator for 10 minutes, then immediately rinsed with water and ethanol. The plate was then immersed in a 0.1 mM solution of ω-mercaptoundecyl bromoisobutyrate initiator in ethanol for 48 hours at room temperature without exposure to light. The catalyst mixture was prepared in a Schlenk flask by dissolving CuCl (28 mg), $CuCl_2$ (8.4 mg) and Me4cyclam (96.8 mg) in degassed methanol (2 mL) under a nitrogen atmosphere and sonicated for 5 minutes until complete dissolution. In a second Schlenk flask, the monomer CBMAA (3,590 mg) was dissolved in degassed water (16.9 mL) and methanol (0.1 mL). After dissolution, the catalyst mixture was added to the monomer mixture under nitrogen. The homogeneous polymerization mixture was added to the reactor with a plate coated with initiator under nitrogen. The polymerization was carried out in the closed reactor for 2 hours at room temperature. The plate was then rinsed with water and stored in phosphate buffer (pH 7.4) at 4° C. before further use.

The above-described polymer brushes were tested for resistance to non-specific adsorption: (a) activated and deactivated surface, (b) activated and functionalized surface after deactivation. The following procedure was analogous for all brushes. The chip with brush was rinsed with water, inserted into the SPR sensor and activated at a flow rate of 10 μL/min for 20 minutes with a solution of 0.1M NHS and 0.5M EDC in deionized water. In case (a) the surface was further washed with borate buffer (10 mM, pH 8.5, flow rate 30 μL/min) for 25 minutes; in case (b) the surface was washed with borate buffer (10 mM, pH 8.5, flow rate 30 μL/min) containing a specific dissolved functional entity with primary amines for 25 min. The following entities were immobilized on the following surfaces:
  poly[HPMAA(84.5 mol %)-co-CBMAA(15 mol %)-co-SBMAA(0.5 mol %)]: amino-terminal DNA oligonucleotide (4 μM solution);
  poly[HPMAA(82 mol %)-co-CBMAA(15 mol %)-co-SBMAA(3 mol %]: anti-bacterial anti-*Salmonella* antibody (50 μg/mL solution);
  poly[HPMAA(55 mol %)-co-CBMAA(15 mol %)-co-SBMAA(30 mol %)]: poly L-lysine (50 μg/mL solution);
  poly[HPMAA(85 mol %)-co-CBMAA(15 mol %)]: anti-bacterial anti-*Salmonella* antibody (50 μg/mL solution), or amino-terminal DNA oligonucleotide (4 μM solution), or poly L-lysine (50 μg/mL solution);
  polyCBAA: anti-bacterial anti-*Salmonella* antibody (50 μg/mL solution), or amino-terminal DNA oligonucleotide (4 μM solution), or poly L-lysine (50 μg/mL solution).

Furthermore, in both cases (a) and (b), the same procedure was used for all surfaces. The brush was deactivated by reaction with 1M (2-aminoethoxy)acetic acid (30 min, flow rate 10 μL/min) and then incubated in PBS (10 mM phosphate buffer+150 mM NaCl+2.7 mM KCl, pH 7.4) for achieving equilibrium and constant sensor response. Then, 100% human blood plasma was injected at a rate of 30 µL/min at 25° C. for 10 minutes, followed by rinsing with PBS. After rinsing with PBS for 10 minutes, higher ionic strength PBS (10 mM phosphate buffer+750 mM NaCl+2.7 mM KCl, pH 7.4) was injected for 5 minutes to wash away the electrostatically adsorbed non-specific deposit, and finally the entire surface was relaxed again in PBS. The level of non-specific adsorption was determined from the difference between the sensor response in PBS before the blood plasma injection and 10 minutes after the end of the injection. The level of non-specific adsorption after washing in higher ionic strength PBS was determined from the difference of the sensor response in PBS before blood plasma injection and 10 minutes after the end of washing in higher ionic strength PBS. The results are shown in FIG. 2, Table 2 and Table 3.

Figure 2:
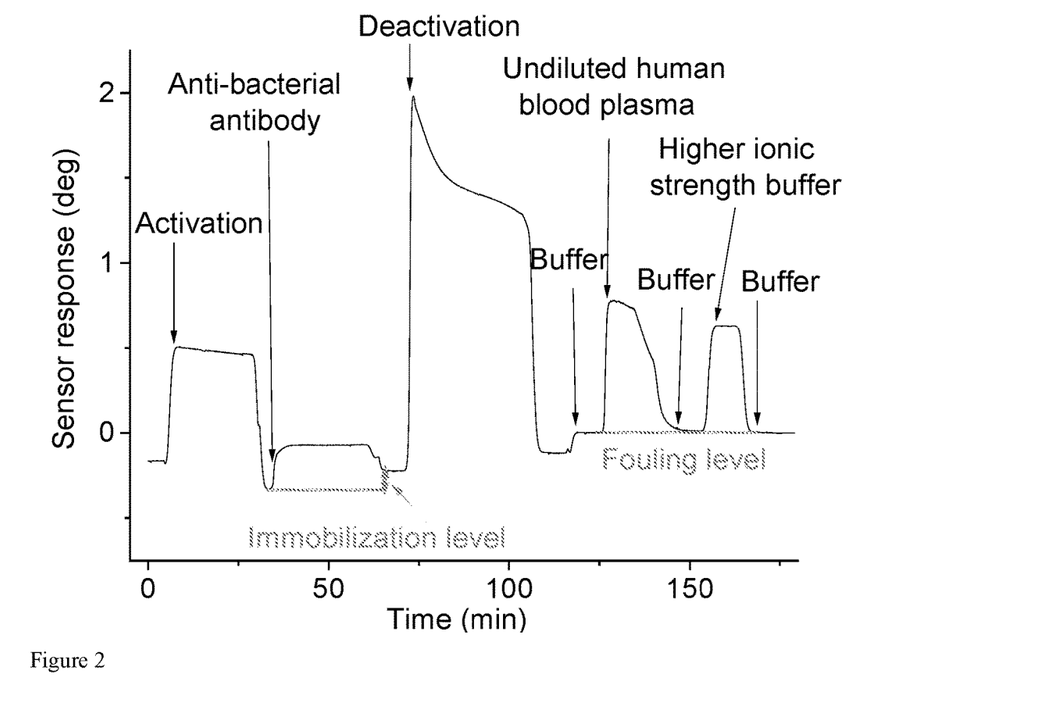
FIG. 2 is a response pattern of SPR sensor with a chip with gold surface coated with the polymer brush, according to Examples 4 and 5.

FIG. 2 demonstrates that even at a concentration of 15 mol % CBMAA in the terpolymer, a sufficient amount of functional element (206 ng/cm$^2$ anti-*Salmonella*) binds to the surface, while achieving high resistance to non-specific adsorption—non-specific adsorption from undiluted human plasma was 0 ng/cm$^2$.

TABLE 2

Non-specific adsorption from undiluted blood plasma after activation and deactivation and activation/covalent binding of anti-*Salmonella* antibody and deactivation.
Non-specific adsorption from undiluted blood plasma [ng/cm$^2$]

|  | poly[HPMAA(82 mol %)-co-CBMAA(15 mol %)-co-SBMAA(3 mol %)] | polyCBAA | poly[HPMAA(85 mol %)-co-CBMAA(15 mol %)] |
|---|---|---|---|
| After activation/deactivation | 8.1 | 66.1 | 20.8 |
| After activation/deactivation and washing with higher ionic strength PBS | 0 | 2.5 | 16.9 |
| After activation/anti-*Salmonella* anchoring/deactivation | 10.9 | 51.9 | 39.5 |
| After activation/anti-*Salmonella* anchoring/deactivation and washing higher ionic strength PBS | 4.5 | 8.5 | 40.9 |

Table 2 demonstrates the improved anti-fouling properties of the poly(HPMAA-co-CBMAA-co-SBMAA) terpolymer brush after activation and immobilization of functional elements compared to known anti-fouling carboxy-functional surfaces. At the same time, it shows a significantly lower level of non-specific adsorption even without the need to wash away the electrostatically adsorbed non-specific deposit.

TABLE 3

Non-specific adsorption from undiluted blood plasma after activation and covalent attachment of positively (poly L-lysine) and negatively (amino-terminated DNA oligonucleotide) charged ligand under given functionalization conditions on terpolymer brushes with different molar proportions of individual monomer units.
Non-specific adsorption from undiluted blood plasma [ng/cm$^2$]

|  | poly[HPMAA(84.5 mol %)-co-CBMAA(15 mol %)-co-SBMAA(0.5 mol %)] | poly[HPMAA(85 mol %)-co-CBMAA(15 mol %)] |
|---|---|---|
| After activation/anchoring of amino-terminal DNA oligonucleotides/deactivation | 1.7 | 4.1 |
| After activation/anchoring of amino-terminated DNA oligonucleotides/deactivation and washing with higher ionic strength PBS | 0 | 3.0 |

TABLE 3-continued

Non-specific adsorption from undiluted blood plasma after activation and covalent attachment of positively (poly L-lysine) and negatively (amino-terminated DNA oligonucleotide) charged ligand under given functionalization conditions on terpolymer brushes with different molar proportions of individual monomer units.
Non-specific adsorption from undiluted blood plasma [ng/cm$^2$]

| | poly[HPMAA(55 mol %)-co-CBMAA(15 mol %)-co-SBMAA(30 mol %)] | poly[HPMAA(85 mol %)-co-CBMAA(15 mol %)] |
|---|---|---|
| After activation/poly L-lysine anchoring/deactivation and washing with higher ionic strength PBS | 6.0 | 11.7 |

Table 3 shows the advantage of tunability of the terpolymer brush composition over a wide range of sulfobetaine component content. For different ligands, the appropriate brush composition can be evaluated on the basis of the charge distribution so that after immobilization the surface remains as neutral as possible and thus resistant to non-specific adsorption. Thus, even lower levels of non-specific adsorption can be achieved than with known functionalizable anti-fouling surfaces without the sulfobetaine component.

Figure 3:
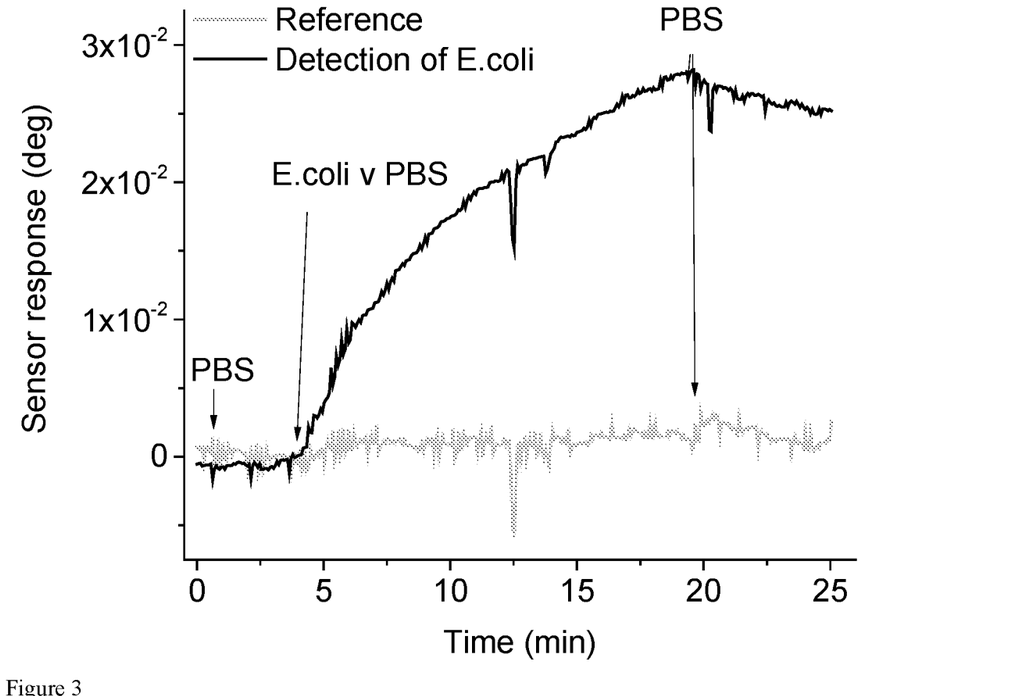
FIG. 3 is a response pattern of SPR sensor upon detection of *E. coli* on the functionalized terpolymer brush, according to Example 6.

Example 6: Biorecognition Ability of Terpolymer Brush after Binding of Functional Entities According to Example 1, poly[HPMAA (75 mol %)-co-CBMAA (15 mol %)-co-SBMAA (10 mol %)] was prepared on the gold surface of the chip. The chip was inserted into the SPR sensor and functionalized with anti-Escherichia coli (*E. coli*) antibody, anti-*E. coli*, and with anti-carcinoembryonic antigen (CEA) antibody, anti-CEA, according to the procedure of Example 3. The latter antibody was used as a reference to show the specificity of *E. coli* detection. After functionalization, the remaining active esters were deactivated for 30 minutes by reaction with a solution of 1M (2-aminoethoxy)acetic acid (30 min, flow rate of 10 μL/min) and then the chip was allowed to stabilize in PBS (10 mM phosphate buffer+150 mM NaCl+2.7 mM KCl, pH 7.4). After stabilizing the sensor response, a solution of 1×10$^7$ CFU/mL of inactivated *E. coli* in PBS (15 min, flow rate of 45 μL/min) was injected onto the chip. The chip was then rinsed again with PBS until the sensor response stabilized. FIG. 3 shows a record of the SPR sensor response. The response from the reference channel (black colour) in which anti-CEA antibody was immobilized was negligible against the specific response of the SPR sensor (red colour) in which anti-*E. coli* antibody was immobilized.

The polymer brushes in Examples 4, 5 and 6 were prepared in the thickness range of the random polymer layer from 80 to 100 nm (thickness was verified by ellipsometry and SPR in water).

Example 7

According to Example 1, the terpolymer brush with a composition of 81 mol % HPMAA, 15 mol % CBMAA, 4 mol % SBMAA was prepared on the gold surface of the chip. The chip was rinsed with water, inserted into the SPR sensor, and the carboxyl groups of CBMAA were activated for 20 minutes at a flow rate of 10 μL/min with a solution of 0.5M EDC and 0.1M NHS in deionized water to form active ester. After activation, the level of sensor response for the surface in water was recorded. 50 μg/mL of bacterial anti-*E. coli* antibody in borate buffer (10 mM, pH 8.5) was soaked in the microfluidic SPR sensor system at a flow rate of 30 μL/min and immobilized with 104±25 ng/cm$^2$ of antibody. Subsequently, the residual active esters were deactivated for 36 minutes with one of three deactivating agent solutions: (1) a solution of glycine (1M in deionized water, pH 7), or (2) a solution of (2-aminoethoxy)acetic acid (1M in deionized water, pH 7).

The surfaces thus prepared were further washed with PBS (10 mM phosphate buffer+150 mM NaCl+2.7 mM KCl, pH 7.4) for 10 minutes. Then, 100% human blood plasma was injected at a rate of 30 μL/min at 25° C. for 10 minutes, followed by washing again with PBS. After washing with PBS for 10 minutes, higher ionic strength PBS (10 mM phosphate buffer+750 mM NaCl+2.7 mM KCl, pH 7.4) was injected for 5 minutes and finally the whole surface was relaxed again in PBS. The non-specific adsorption was determined from the difference in sensor response in PBS before blood plasma injection and 10 minutes after injection. The non-specific adsorption after washing with PBS with higher ionic strength was determined from the difference between the sensor response in PBS before the injection of blood plasma and 10 minutes after the end of injection with higher ionic strength PBS.

TABLE 4

Deactivation of residual active esters - non-specific adsorption from undiluted blood plasma after deactivation by two deactivation reagents

| Deactivating agent | Non-specific adsorption from 100% blood plasma (ng/cm$^2$) | Non-specific adsorption from 100% blood plasma/washing with higher ionic strength PBS (ng/cm$^2$) |
|---|---|---|
| Glycine | 20.3 | 13.7 |
| (2-aminoethoxy)acetic acid | 21.2 | 18.1 |

Figure 4:
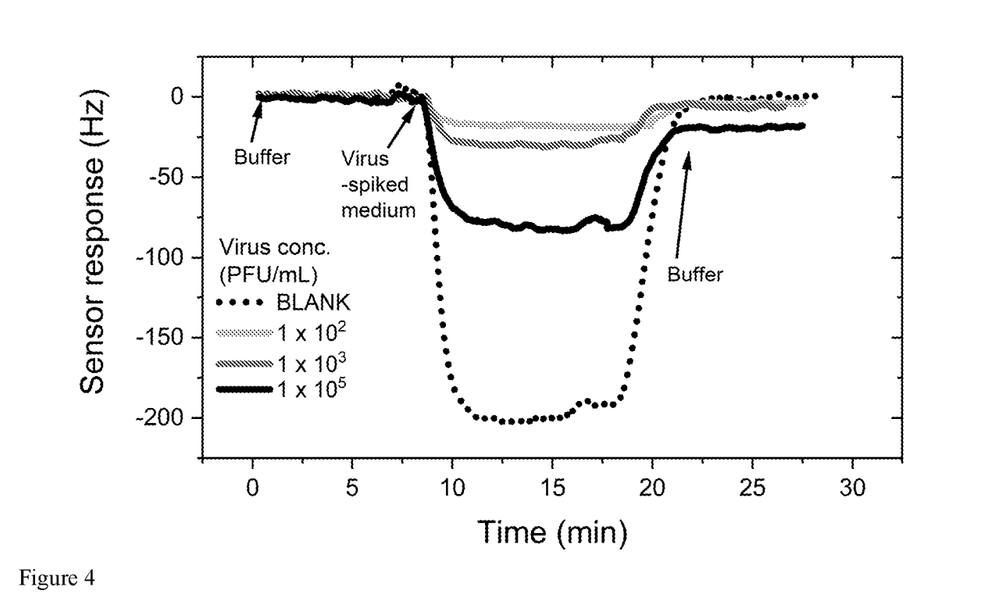
FIG. 4: Detection of SARS-Cov-2 spiked in cell cultured medium using poly[HPMAA(77 mol %)-co-CBMAA (20 mol %)-co-SBMAA(3 mol %)] functionalized QCM platform with anti- SARS-Cov-2 antibodies (Example 8).

Example 8: QCM Biosensor Based on Antibody-Functionalized Terpolymer Brush for Direct Label-Free Detection of SARS-CoV-2 in Complex Biological Media To prepare poly[HPMAA(77 mol %)-co-CBMAA (20 mol %)-co-SBMAA(3 mol %)]-coated QCM crystals (QCM=quartz crystal microbalance), QCM crystals with a thin gold layer were cleaned in UV-ozone cleaner for 10 minutes and subsequently rinsed with ultra-pure water and ethanol. Immediately after the cleaning, the crystals were immersed in an initiator solution of a 1 mM ω-mercaptoundecyl bromoisobutyrate in ethanol to form a self-assembled monolayer (SAM) and were left in the solution for 3 days at room temperature in dark. Methanol and water were degassed via 6 freeze-pump-thaw cycles. The catalyst solution was prepared as follows: under the nitrogen atmosphere $CuCl$ (151.9 mg), $CuCl_2$ (29.4 mg), and Me4Cyclam (338.8 mg) in a Schlenk tube were mixed with 7.1 mL of degassed methanol. The mixture was sonicated for 5 minutes to dissolve all solids. In a second Schlenk tube, monomers SBMAA (0.483 g, 3 mol %), CBMAA (2.667 g, 20 mol %), or HPMAA (6.069 g, 77 mol %) were dissolved in 13.3 mL degassed water and 46.1 mL degassed methanol and stirred. After the dissolution was completed, the catalyst solution was added to the monomer solution using a gastight syringe. The polymerization mixture was added into the reactor containing the substrates coated with the initiator SAM. The polymerization was carried out for 2 hours at room temperature. Finally, the samples were washed with ultra-pure water and stored in PBS at 6° C. until used. Before the experiment, QCM crystal coated with poly[HPMAA(77 mol %)-co-CBMAA (20 mol %)-co-SBMAA(3 mol %)] was removed from storing solution, rinsed with ultrapure water, and mounted into QCM sensor with the microfluidic system. After, it was washed with PBS buffer for 5 minutes (a flow rate of 45 µl/min) and ultrapure water for 5 minutes (45 µl/min). Subsequently, brushes were activated with a freshly prepared solution of 0.1 M NHS and 0.5 M EDC for 20 minutes (7 µl/min). Afterward, the coatings were washed for 3 minutes (60 µl/min) with HEPES buffer (5 mM HEPES, pH 6). The 50 µg/mL of the anti-SARS-Cov-2 (N-protein) antibody was diluted in HEPES buffer (5 mM HEPES, pH 7) and the solution was added and left to react with activated coating for 12 minutes (15 µl/min). After, all coatings were rinsed again with HEPES buffer (5 mM HEPES, pH 6) for 10 minutes (30 µl/min) and immersed in the deactivation solution of AEAA (1M aminoethoxy acetic acid, pH 7) for 25 minutes (7 µl/min). After, the coatings were rinsed with PBS for 10 minutes (30 µl/min) to create a baseline. Afterward, the SARS-Cov-2-spiked cell medium samples (ranging from 0 (blank) to $1\times10^6$ PFU/mL) were added and let react for 12 minutes (30 µl/min). Finally, all the coatings were rinsed with PBS buffer for 10 minutes (30 µl/min). The concentration dependency of QCM sensor response is depicted in FIG. 4.

Example 9: QCM Biosensor Based on Peptide-Functionalized Terpolymer Brush for Direct Detection of SARS-CoV-2 in Complex Biological Medium The QCM sensor coated with poly[HPMAA(77 mol %)-co-CBMAA (20 mol %)-co-SBMAA(3 mol %)] was prepared as described in Example 2.

Figure 5:
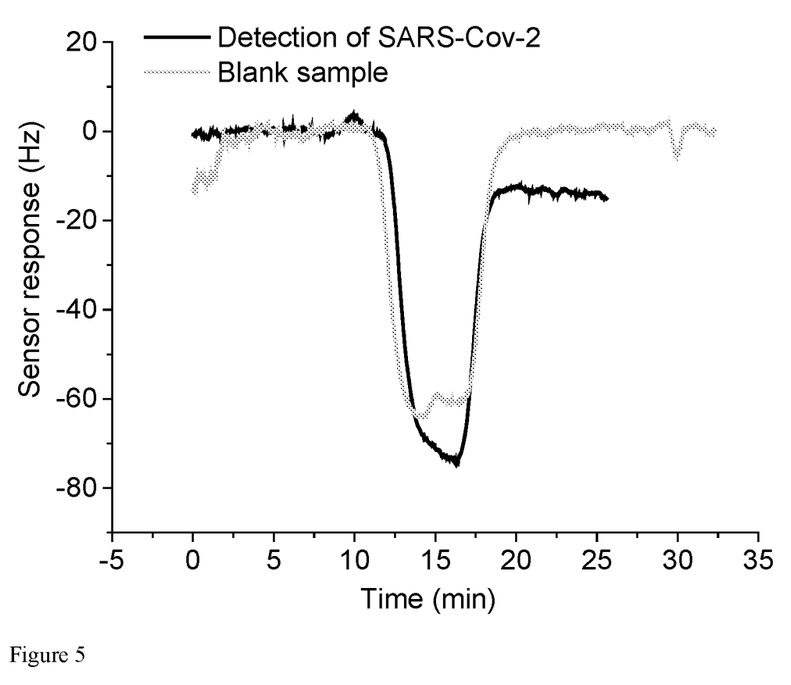
FIG. 5: Detection of $1 \times 10^5$ PFU/mL SARS-CoV-2 spiked in cultured cell medium using QCM sensor based on short peptide-functionalized poly[HPMAA(77 mol %)-co-CBMAA (20 mol %)-co-SBMAA(3 mol %)] surface (Example 9). The figure shows the detection response (black line) and blank response (red).

Before the experiment, QCM crystal coated with poly [HPMAA(77 mol %)-co-CBMAA (20 mol %)-co-SBMAA(3 mol %)] was removed from storing solution, rinsed with ultrapure water, and mounted into QCM sensor with the microfluidic system. Afterwards, it was washed with PBS buffer for 5 minutes (a flow rate of 45 µl/min) and ultrapure water for 5 minutes (45 µl/min). Subsequently, brushes were activated with a freshly prepared solution of 0.1 M NHS and 0.5 M EDC for 20 minutes (7 µl/min). Afterward, the coatings were washed for 3 minutes (60 µl/min) with HEPES buffer (5 mM HEPES, pH 6). The 50 µg/mL of a short polyK-modified peptide sequence (GSGGSG-IEEQAKTFLDKFNHEAEDLFYQS, SEQ ID NO. 1) with a high affinity to SARS-Cov-2 was diluted in HEPES buffer (5 mM HEPES, pH 7) and the solution was added and left to react with activated coating for 12 minutes (15 µl/min). After, all coatings were rinsed again with HEPES buffer (5 mM HEPES, pH 6) for 10 minutes (30 µl/min) and immersed in the deactivation solution of AEAA (1M aminoethoxy acetic acid, pH 7) for 25 minutes (7 µl/min). Then, the coatings were rinsed with PBS for 10 minutes (30 µl/min) to create a baseline. Afterwards, the $1\times10^5$ PFU/mL SARS-Cov-2-spiked cell medium or pure unspiked cell medium (blank) sample was added and let react for 12 minutes (30 µl/min). Finally, all the coatings were rinsed with PBS buffer for 10 minutes (30 µl/min). The example of detection is depicted in FIG. 5.

---

The invention claimed is:

1. A random terpolymer of N-(2-hydroxypropyl) methacrylamide, carboxybetaine methacrylamide and sulfobetaine methacrylamide.

2. The random terpolymer according to claim 1, containing:
   0.1 mol % to 40 mol % of sulfobetaine methacrylamide;
   0.1 mol % to 50 mol % of carboxybetaine methacrylamide; and
   N-(2-hydroxypropyl) methacrylamide forming balance to 100 mol %.

3. A polymer brush having structure I

S—R-poly(N-(2-hydroxypropyl) methacrylamide (HPMAA)-co-carboxybetaine methacrylamide (CBMAA)-co-sulfobetaine methacrylamide (SBMAA))    (I)

wherein
   S is a substrate having a surface suitable for binding of polymerization initiators;
   R is a residue of a polymerization initiator selected from the group consisting of atom-transfer radical polymerization (ATRP) initiators, single-electron transfer living radical polymerization (SET-LRP) initiators and reversible addition fragmentation transfer (RAFT) agents;
   poly(HPMAA-co-CBMAA-co-SBMAA) is a random terpolymer according to claim 1; and
   — is a covalent bond.

4. A functionalized polymer brush having structure II

S—R-poly(N-(2-hydroxypropyl) methacrylamide (HPMAA)-co-carboxybetaine methacrylamide (CBMAA)-co-sulfobetaine methacrylamide (SBMAA))-F    (II)

wherein
   S is a substrate having a surface suitable for binding of polymerization initiators;
   R is a residue of a polymerization initiator selected from the group consisting of atom-transfer radical polymerization (ATRP) ATRP initiators, single-electron transfer living radical polymerization (SET-LRP) SET LRP initiators and reversible addition fragmentation transfer (RAFT) RAFT agents;
   poly(HPMAA-co-CBMAA-co-SBMAA) is a random terpolymer according to claim 1; — is a covalent bond; and
   F is at least one functional entity covalently bound to the random terpolymer by amide bond formed between -NH-group of the functional entity and —C(O)-group of carboxybetaine methacrylamide.

5. The functionalized polymer brush according to claim 4, wherein the functional entity F is selected from the group consisting of proteins, antibodies, peptides, nucleic acids, and oligonucleotides.

6. The polymer brush according to claim 3, wherein a thickness of a layer of the random terpolymer in the polymer brush is 10 nm to 500 nm, as measured by ellipsometric method in water.

7. A method for preparation of the functionalized polymer brush according to claim 4, comprising the steps of:
   subjecting carboxybetaine carboxyl groups in the polymer brush to a reaction with activation agents for activation of the carboxyl groups to form active ester groups;
   subjecting the active ester groups to a reaction with amino group of the functional entity to form an amide covalent bond;
   subjecting unreacted active ester groups to a reaction with (2-aminoethoxy) acetic acid and/or glycine.

8. A method for increasing the resistance of a surface against non-specific adsorption of substances from biological media and/or against non-specific interactions with biological media components, comprising the step of applying the random terpolymer according to claim 1 on the surface.

9. A method for increasing the resistance of a substrate surface against non-specific adsorption of substances from biological media and/or against non-specific interactions with biological media components, comprising the step of grafting the polymer brush according to claim 3 on the substrate surface.

10. A method for specific and selective interactions with target analytes selected from proteins, peptides, nucleic acids, and oligonucleotides, comprising the step of contacting the target analytes with the functionalized polymer brush according to claim 4.

11. A sensor, characterized in that it comprises the polymer brush according to claim 3.

12. The sensor according to claim 11, which is selected from surface plasmon resonance sensors, quartz crystal microbalances and fluorescent sensors.

13. A membrane, characterized in that it comprises the polymer brush according to claim 3.

14. The functionalized polymer brush according to claim 4, wherein a thickness of a layer of the random terpolymer in the polymer brush is 10 nm to 500 nm, as measured by ellipsometric method in water.

15. The functionalized polymer brush according to claim 5, wherein a thickness of a layer of the random terpolymer in the polymer brush is 10 nm to 500 nm, as measured by ellipsometric method in water.

16. A method for increasing the resistance of a substrate surface against non-specific adsorption of substances from biological media and/or against non-specific interactions with biological media components, comprising the step of grafting the functionalized polymer brush according to claim 4 on the substrate surface.

17. A sensor, characterized in that it comprises the functionalized polymer brush according to claim 4.

18. The sensor according to claim 17, which is selected from surface plasmon resonance sensors, quartz crystal microbalances and fluorescent sensors.

19. A membrane, characterized in that it comprises the functionalized polymer brush according to claim 4.

20. A membrane, characterized in that it comprises the functionalized polymer brush according to claim 5.

* * * * *

SEQUENCE LISTING

<160> NUMBER OF SEQ ID NOS: 1

<210> SEQ ID NO 1
<211> LENGTH: 29
<212> TYPE: PRT
<213> ORGANISM: artificial
<220> FEATURE:
<223> OTHER INFORMATION: synthesized

<400> SEQUENCE: 1

Gly Ser Gly Gly Ser Gly Ile Glu Glu Gln Ala Lys Thr Phe Leu Asp
1               5                   10                  15

Lys Phe Asn His Glu Ala Glu Asp Leu Phe Tyr Gln Ser
            20                  25